March 16, 1965  J. L. HAZELTINE  3,173,264

HYDRAULIC PRESSURE BOOSTERS

Filed Feb. 7, 1964

John L. Hazeltine, INVENTOR.

United States Patent Office 3,173,264
Patented Mar. 16, 1965

3,173,264
HYDRAULIC PRESSURE BOOSTERS
John L. Hazeltine, San Marcos, Calif., assignor of one-half to Peter Eaton, Escondido, Calif.
Filed Feb. 7, 1964, Ser. No. 343,264
1 Claim. (Cl. 60—54.5)

This invention relates to hydraulic control systems in general, and more specifically to a hydraulic pressure booster which can be placed in a hydraulic control system for the purpose of multiplying the ultimate fluid pressure developed by a given applied working force. Although this invention is shown and described in connection with an automotive hydraulic brake system, this is in no way intended to limit its application with respect to other various hydraulic control systems.

Controllability and ease of operation of a hydraulic control system are directly proportional to the degree of efficiency with which the system operates. The operating efficiency of an automotive hydraulic brake system is dependent upon many factors, the most important of which are the condition of the system, vehicular weight in excess of the designed curb weight, speed and rate of deceleration and the amount of heat created thereby, type and quality of friction materials utilized and the varying ability of the operator to apply adequate input working force for a sufficient period of time. It is, therefore desirable and, in many cases, necessary to insert a pressure boosting device into the system in order to insure that a desirable degree of braking efficiency and the resulting controllability and ease of operation is available at all times.

The general object of my invention is to provide an improved design for a hydraulic booster unit which may be included in a conventional hydraulic control system for the purpose of increasing hydraulic pressure within the system over that provided by the standard input source or pressure creating device such as the master cylinder of an automotive hydraulic brake system.

A further object of my invention is to accomplish the pressure multiplication utilizing the existing hydraulic pressure as the sole power source while remaining unaffected by volumetric flow and the undesirable side effects thereof.

These and other objects have been attained in a booster unit of novel construction embodying my invention and consisting of a housing having an internal bore forming a differential cylinder, a differential piston movable within said differential cylinder, and a valve assembly consisting of a valve and valve stem integrally attached to the piston, and a stationary valve seat which also forms the input port. An outlet port or ports is located in the same chamber as the inlet port. A fluid passage extends axially through the valve stem and piston, permitting the flow of fluid to the large cylinder. A single spring urges the piston towards the large end of the cylinder and, at the same time, holds the valve in a normally open position.

How the above objects and advantages of my invention are attained will be more readily understood by reference to the following description and to the annexed drawing in which.

Figure 1:
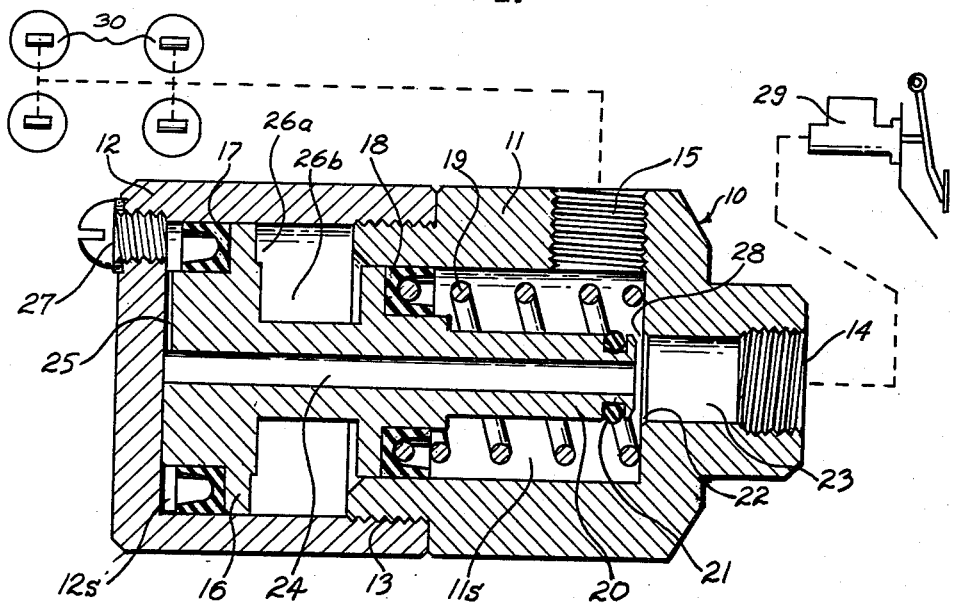
FIG. 1 is a longitudinal median section through a hydraulic booster unit constructed according to my invention, the parts being shown in the rest position occupied when the brakes are released.

Referring now to FIG. 1, the booster unit as embodied in a preferred form of my invention is shown as an accessory unit which can be added to an automotive hydraulic brake system.

The booster unit comprises a housing 10 made in two parts 11 and 12 which are joined together in any suitable manner as by a screw threaded joint 13. Each of the housing sections 11 and 12 is a cup shaped member having a cylindrical bore. The bore inside the housing section 11 is smaller in diameter than that inside the housing section 12 so that when the two sections of the housing are connected together as shown in FIG. 1, the housing 10 has an internal bore constituting a differential cylinder with the portion of larger diameter at the end of the housing 10 opposite the inlet port 14 and the outlet port 15.

Within this bore is differential piston 16 provided with suitable seals 17 and 18 between the piston and the walls of the cylinder bore. The piston 16 divides the interior bore of the housing into a high pressure chamber 11s and a low pressure chamber 12s, chamber 12s having the larger diameter.

Piston 16 is movable axially within housing 10. The piston is urged to the left or larger end of the housing by means of spring 19 which, normally under compression, bears against the smaller end of the piston and also against the opposing end face of the internal bore of the housing.

The sealing element comprising the valve stem 20, which is an extension of piston 16, and a valve seal 21, which is located at the extreme end of valve stem 20 within a predetermined distance from the lip 22 of valve chamber 23, extends into chamber 11s.

A fluid passage 24 extends through the valve stem 20 and the piston 16. A small slot 25 is cut in that portion of the large end of piston 16 which contacts the end wall of chamber 12s, said slot connecting passage 24 with chamber 12s when piston 16 is in the rest position.

An air chamber which is formed by sub-air chambers 26a and 26b permits the movement of piston 16 to the right. Sub-air chamber 26a is the space between the smaller diameter of the piston and the larger diameter cylinder bore in housing section 12. Sub-air chamber 26b is formed by a recess cut in piston 16, said sub-air chamber being substantially equal in volume to sub-air chamber 26a.

Housing 10 is provided with one or more sealable openings such as bleeder plug 27 and outlet port 15 through which air may be bled from pressure chambers 11s and 12s in order that the system may be filled with hydraulic fluid, said bleeder openings being located at the top of pressure chambers 11s and 12s.

Having described the construction of a preferred form of my invention, I shall now describe briefly its operation. It will be understood that prior to any application of an input operating force, the entire brake system including inlet port 14, valve chamber 23, pressure chambers 11s and 12s, fluid passage 24, slot 25 and outlet port 15 is full of hydraulic fluid.

When the vehicle operator applies the brakes, the master cylinder or source 29 delivers hydraulic fluid under pressure through inlet port 14, through valve chamber 23, through opening 28 between the valve stem 20 and valve chamber lip 22, on into high pressure chamber 11s, through outlet port 15 and on to the brake cylinders or load 30. It should be noted that at no time during this initial volumetric surge is fluid forced through fluid passage 24 and into low pressure chamber 12s. This is significant in that piston 16 is not subject to any volumetric forces which would tend to move it prematurely as would be the case if the inlet port was located in the back wall of cylinder 12 and the initial volumetric surge traveled through fluid passage 24.

Figure 2:
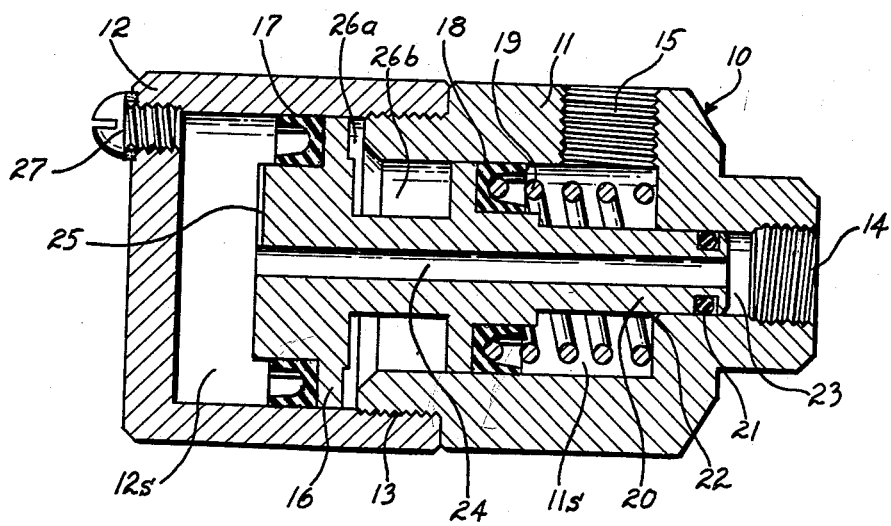
FIG. 2 is a view similar to FIG. 1 but showing the position of the parts during application of the brakes and after the piston has been moved to the right from the rest position to close the valve.

The flow of hydraulic fluid from the source 29 to the load 30 continues until all the mechanical slack in the system is taken up and a predetermined pressure is attained. This predetermined pressure, acting upon the larger face of piston 16, located within low pressure chamber 12s, overcomes the opposing force on the smaller face of piston 16, located within high pressure chamber 11s, created by the combination of spring 19 and the fluid pressure existing in high pressure chamber 11s. Piston 16 commences to move to the right whereupon valve stem 20 and valve seal 21 enter valve chamber 23 as shown in FIG. 2. At the instant valve seal 21 contacts the valve chamber lip 22, low pressure chamber 12s is sealed off from high pressure chamber 11s and the flow of fluid from the source 29 is diverted through passage 24 and into low pressure chamber 12s, bringing the compounding action into play.

As will be noted in FIG. 1, by placing the valve seal 21 on the valve stem 20 rather than within valve chamber 23, the piston travel required to close the valve may be kept at a minimum without effectively restricting the flow of fluid from the source 29 to the load 30 during the initial preloading action. This is significant in that the piston movement required to close the valve is reflected at the source in the form of nonproductive pedal loss. The restriction of fluid either during the preload action or when the input force is released will often cause erratic action of the booster and/or the brakes themselves.

When piston 16 moves to the right as illustrated in FIG. 2, sub-air chamber 26a decreases in size. The air displaced is compressed into the remaining portion of sub-air chamber 26a and sub-air chamber 26b.

When the brakes are released, fluid flow is the reverse of that previously described. The pressure in the hydraulic lines combined with the force of spring 19 causes piston 16 to move to the left, returning to the position illustrated in FIG. 1, and, at the same time withdraws valve stem 20 and valve seal 21 from the valve chamber 23, allowing fluid to return from the wheel cylinders or load 30 to the master cylinder or source 29.

From the foregoing description it will be apparent that various changes in the design of my booster unit may occur to persons skilled in the art but without departing from the spirit and scope of my invention. Accordingly, it is to be understood that the foregoing description is considered as being an illustration of, rather than a limitation upon the invention as defined by the following claim.

I claim:

A fluid pressure booster for hydraulic control systems comprising: a housing having an internal bore forming a differential cylinder; a differential piston moveable axially within said differential cylinder and dividing said differential cylinder into a high pressure chamber and a low pressure chamber; a fluid inlet port and a fluid outlet port located at the high pressure end of the housing and opening into the said high pressure chamber; a valve stem located within the high pressure chamber, said valve stem being an integral part of and operated by the differential piston; a fluid passage passing centrally through the valve stem and the differential piston, said fluid passage providing communication between the high pressure chamber and the low pressure chamber, said communication being effective only after the differential piston has moved from its rest position; a valve sealing element located at the extreme end of the valve stem, which end being furthest from the body of the differential piston; a valve chamber communicating directly with the inlet port and located centrally in the housing end of the high pressure chamber, the internal lip of said valve chamber being located within a predetermined distance from the end of the valve stem containing the valve sealing element, said predetermined distance being sufficient to allow the unrestricted passage of fluid from the inlet port into the high pressure chamber and out the outlet port; a spring means located within the high pressure chamber, said spring means acting upon the differential piston in such a manner as to restrain the movement of said differential piston until a predetermined hydraulic pressure is created in the high pressure chamber, the fluid passage and the low pressure chamber, at which time the said differential piston moves toward the inlet port, inserts the valve stem and the valve sealing element into the valve chamber, said insertion of the valve stem and valve sealing element sealing the inlet port from the outlet port and the high pressure chamber from the low pressure chamber and diverting the entire fluid flow and hydraulic pressure created by the input or operating source into the low pressure chamber via the fluid passage, said fluid flow and hydraulic pressure acting upon the low pressure side or face of the differential piston in such a manner as to create a proportionately greater fluid pressure within the high pressure chamber, said greater fluid pressure being transmitted via the outlet port to the load.

References Cited by the Examiner

UNITED STATES PATENTS

| | | | |
|---|---|---|---|
| 2,580,353 | 12/51 | Hunt | 60—54.5 |
| 2,765,625 | 10/56 | Hart | 60—54.6 X |
| 3,036,436 | 5/62 | Mitton | 60—54.5 |

JULIUS E. WEST, *Primary Examiner.*

ROBERT R. BUNEVICH, *Examiner.*